(12) United States Patent
Jiang et al.

(10) Patent No.: US 9,424,115 B2
(45) Date of Patent: Aug. 23, 2016

(54) ANALYSIS ENGINE FOR AUTOMATICALLY ANALYZING AND LINKING ERROR LOGS

(71) Applicant: SuccessFactors, Inc., South San Francisco, CA (US)

(72) Inventors: Yunfeng Jiang, Shanghai (CN); Yijun Jiang, Shanghai (CN)

(73) Assignee: SuccessFactors, Inc., San Mateo, CA (US)

( * ) Notice: Subject to any disclaimer, the term of this patent is extended or adjusted under 35 U.S.C. 154(b) by 254 days.

(21) Appl. No.: 13/922,066

(22) Filed: Jun. 19, 2013

(65) Prior Publication Data

US 2014/0365828 A1 Dec. 11, 2014

(30) Foreign Application Priority Data

Jun. 7, 2013 (CN) .......................... 2013 1 0225262

(51) Int. Cl.
*G06F 11/00* (2006.01)
*G06F 11/07* (2006.01)

(52) U.S. Cl.
CPC ....... *G06F 11/0709* (2013.01); *G06F 11/0706* (2013.01)

(58) Field of Classification Search
CPC ........... G06F 11/079; G06F 17/30569; G06F 11/366; G06F 17/2705; G06F 17/272; G06F 17/30964; G06F 21/552; G06F 11/0784; G06F 11/2257; G06F 11/3476; G06F 17/271; G06F 11/0766; H04L 41/069
USPC .......................................... 714/38.1, 48, 57
See application file for complete search history.

(56) References Cited

U.S. PATENT DOCUMENTS

| | | | |
|---|---|---|---|
| 5,463,768 A * | 10/1995 | Cuddihy et al. | 714/37 |
| 5,568,491 A * | 10/1996 | Beal et al. | 714/746 |
| 5,799,148 A | 8/1998 | Cuddihy et al. | |
| 6,571,251 B1 * | 5/2003 | Koski et al. | |
| 6,622,264 B1 * | 9/2003 | Bliley et al. | 714/26 |
| 6,629,267 B1 | 9/2003 | Glerum et al. | |
| 6,757,837 B1 | 6/2004 | Platt et al. | |
| 7,136,768 B1 * | 11/2006 | Shah et al. | 702/115 |
| 7,191,364 B2 | 3/2007 | Hudson et al. | |
| 7,257,744 B2 * | 8/2007 | Sabet | H04L 12/24 709/224 |
| 7,475,286 B2 * | 1/2009 | Altaf et al. | 714/27 |
| 7,509,539 B1 * | 3/2009 | Denefleh et al. | 714/48 |
| 7,689,872 B2 * | 3/2010 | Doyle et al. | 714/48 |
| 7,712,087 B2 | 5/2010 | Kogan et al. | |
| 7,836,341 B1 * | 11/2010 | Krishnan | 714/26 |
| 7,836,346 B1 * | 11/2010 | Davidov et al. | 714/38.1 |
| 7,890,814 B2 | 2/2011 | Zhang et al. | |
| 7,930,683 B2 | 4/2011 | Li | |
| 8,041,996 B2 | 10/2011 | Rathunde et al. | |
| 8,140,514 B2 * | 3/2012 | Nguyen et al. | 707/708 |
| 8,145,949 B2 | 3/2012 | Silver | |
| 8,296,605 B2 | 10/2012 | John | |
| 8,316,344 B2 | 11/2012 | Kaetker et al. | |

(Continued)

*Primary Examiner* — Elmira Mehrmanesh
(74) *Attorney, Agent, or Firm* — Klarquist Sparkman, LLP

(57) ABSTRACT

Test results can be analyzed and linked using an automated system. In a first embodiment, an error log can be received including log data associated with an error. The log data can be parsed to transform it into a standardized format to allow for easier searching and comparison. Once standardized, an automatic comparison can be made between the parsed log data and previous errors obtained from error logs. If a match is found between the parsed log data and a previous error, then the parsed log data can be linked to the previous error so as to generate a relationship between the two.

16 Claims, 6 Drawing Sheets

(56) References Cited

U.S. PATENT DOCUMENTS

| | | |
|---|---|---|
| 8,453,014 B2 | 5/2013 | Kunii et al. |
| 8,595,553 B2 * | 11/2013 | Goertler et al. .............. 714/26 |
| 8,782,609 B2 * | 7/2014 | Robinson .................. 717/127 |
| 8,812,659 B2 * | 8/2014 | Mestemaker ......... H04L 41/046 709/224 |
| 2005/0262399 A1 * | 11/2005 | Brown et al. ................ 714/38 |
| 2006/0123389 A1 * | 6/2006 | Kolawa et al. ............. 717/101 |
| 2006/0136784 A1 * | 6/2006 | Prescott et al. .............. 714/38 |
| 2007/0074149 A1 * | 3/2007 | Ognev et al. .............. 717/101 |
| 2007/0180094 A1 | 8/2007 | Roth |
| 2008/0162688 A1 * | 7/2008 | Reumann et al. ........... 709/224 |
| 2009/0006883 A1 * | 1/2009 | Zhang et al. .................. 714/1 |
| 2010/0299654 A1 * | 11/2010 | Vaswani et al. ............. 717/128 |
| 2011/0088011 A1 | 4/2011 | Ouali |
| 2011/0219360 A1 | 9/2011 | Srinivasa et al. |
| 2012/0278194 A1 * | 11/2012 | Dewan et al. .............. 705/26.1 |

* cited by examiner

SOFTWARE 680 IMPLEMENTING DESCRIBED TECHNOLOGIES

ANALYSIS ENGINE FOR AUTOMATICALLY ANALYZING AND LINKING ERROR LOGS

BACKGROUND

Developing new applications can involve intensive tests to ensure that application goals are met. For example, application designers typically have quality considerations that must be taken into account. In order to test the applications, the application designer writes specific test cases, conducts usability studies, and performs time intensive ad-hoc testing to ensure that design goals are met. For efficiency, automated tests can be created that mimic human interaction with the application, such as automatically selecting buttons, menu items, etc. Based on the tests, an error log is typically generated. The error log can include test results with various fields of information about the error. The error log can be analyzed to determine the cause of the error so that corrections can be made to the application.

Currently, analysis of error logs consume significant time and money. The application designer analyzes the reason for the error and makes a determination of how to implement corrective action. The same errors can re-occur multiple times, and if the person reviewing the error log does not recall the reason for the error, he or she must re-determine the cause and solution.

SUMMARY

Error logs can be analyzed and linked using an automated system. In a first embodiment, an error log can be received including log data associated with an error. The log data can be parsed to transform it into a standardized format to allow for easier searching and comparison. Once standardized, an automatic comparison can be made between the parsed log data and previous errors obtained from error logs. If a match is found between the parsed log data and a previous error, then the parsed log data can be linked to the previous error so as to generate a relationship there between.

In another embodiment, a user can change the stored linking information. By receiving user-supplied corrective linking information, the system can be educated in how to handle future situations so that linking can be more accurate. Thus, a self-learning mechanism allows increased accuracy as more results are obtained. Ultimately, as the system continues to link results together, more accurate matching of test failures with a root cause can be obtained.

In another embodiment, a set of rules can be implemented in order customize whether a match occurs. For example, a matcher can filter results based on an error type, an error message, trace data, a location in source code, etc. By customizing which or how many of such matching criteria are met before a match is found allows a user to configure a range of matched results. Thus, a user can increase the range by requiring less criteria to match. Alternatively, the user can decrease the range (less matches) by requiring more criteria to be matched.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The foregoing and other objects, features, and advantages of the invention will become more apparent from the following detailed description, which proceeds with reference to the accompanying figures.

DETAILED DESCRIPTION

Figure 1:
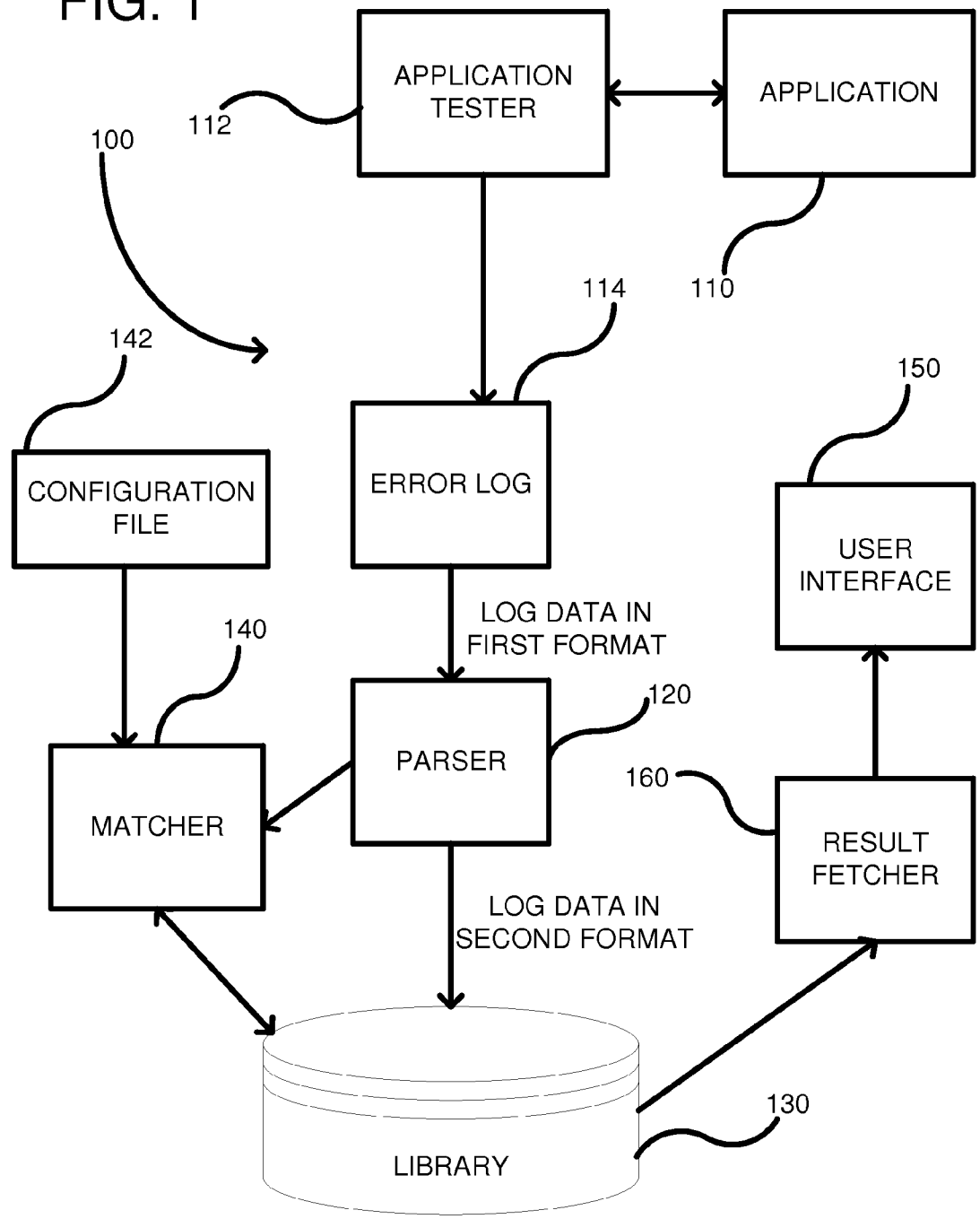
FIG. 1 is a system diagram according to one embodiment for automatically analyzing error logs.

FIG. 1 is a system 100 according to one embodiment for automatically analyzing error logs. An error log, as used herein, is any machine generated file or message that serves as test results, exception, error message, or application log. Thus, an error log can be anything automatically generated by an application under test to identify a failure. An application 110 can be analyzed by an application tester 112. In one particular example, the application 110 can have user interface elements including buttons, menu items, sliders, etc. that are selectable by a user. The application tester 112 can automatically mimic selection of the user interface elements and compare reactions of the application 110 to predetermined results. If there is a discrepancy, then an error is generated and can be stored in an error log 114. The error log can be input into a parser 120, which receives log data from the error log in a first format, and outputs the log data in a second format. The log data can include multiple fields, which provide information about the error. In one example, the parser can search through the log data to find an error type and place the error type as a first field in an error log to be stored in a library 130. Other fields can be similarly searched for and reorganized so as to store log data in a consistent format in the library 130. As part of the transformation, the parser can generate new fields to be included in the error log, such as a unique identifier.

An example output of the parser can include the following fields which are associated with an error:

Event Identifier—the parser can generate a unique identifier of each error for storage and identification in the library 130.

Error type—the error type can be an identifier associated with the error that occurred and can be a number, text, alphanumeric, etc.

Error message—the error message can be a textual description of the error that occurred.

Trace—the trace can include a series of code statements that were executed up until a trigger event occurred, which prompted the error.

Source context—the context can be a location in the source code associated with the error that occurred.

Raw Content—the raw content can be provided by the application.

Linking type—An error can have one of three linking types:

a. Base linking type—a new error not yet seen generates a base linking type.

b. Matched linking type—if a match was found, then the linking type is matched. Multiple matched linking types can be linked to the same base linking type.

c. Root linking type—If a user updates the linking type so that a matched linking type needs to be converted into a base linking type, then the linking type being replaced becomes a root linking type.

It is well understood that certain of the above fields can be eliminated and others added. Once the parser 120 stores the transformed error log in the library 130 (including the fields identified above), it calls a matcher 140. The matcher 140 can read a configuration file 142, which can be dynamically configured by a user, such as through a user interface 150. The configuration file 142 can instruct the matcher 140 how to customize the matching. For example, the matcher 140 can filter results based on one or more of the following fields described above: an error type, an error message, trace data, a location in source code, etc. By customizing which or how many of such matching criteria are met before a match is found allows a user to configure a range of matched results. Thus, a user can increase the range by requiring less criteria to match. Alternatively, the user can decrease the range by requiring more criteria to be matched.

In one example, the matcher 140 can match the error type and the error message. The error message stored in the library 130 can include a list of possible error expressions used to identify a single error type. Different users can describe errors differently and the list of error expressions allows for alternative expressions that can identify the same error. An example list is shown below.

```
String[ ] regex = new String[8];
regex[0] = "Element.*not (present|found)";
regex[1] = ".*?[t,T]ext.*not (present|found)";
regex[2] = "Text .*? did not disappear from the page within the specified timeout";
regex[3] = "Selenium object was null.*?expected:.*?(true|false).*?but\\was.*?(true|false).*?";
regex[4] = "Expected to find the text \"Company Id:\" on the application login page but didn't.*?";
regex[5] = ".*?expected.*?(true|false).*?but\\was.*?(true|false).*?";
regex[6] = ".*?fails: Cannot locate element with:.*?";
regex[7] = "Expected mail.*?Please be advised that the document.*?for runtimeAdded.*?has been created";
```

If the matcher 140 matches any one of the expressions in the list, than the error message can be considered matched. Thus, the matcher 140 can methodically compare the parsed log data to a plurality of candidate errors in the library 130. First, the error type can be compared and, if there is a match between the error type of the parsed log data and the candidate error, then further analysis can be performed. For example, an error message of the parsed log data can be compared to the error message of the candidate error. If the parsed log data matches both the error type and the error message, then depending on the configuration file, either a match has occurred or additional data can be compared. For example, the matcher can continue to determine if one or both of a trace and/or a source context are matched. In any event, if a match is found, the linking type of the candidate error can be used as the linking type of the parsed log data. Thus, a relationship can be established between the parsed log data and the candidate error.

A result fetcher 160 can be responsive to the user interface 150 in order to search the library 130 for desired results. For example, the user interface 150 can be used to communicate with the result fetcher 160 requesting stored errors of a certain type. This can allow a user to identify errors that have occurred in the past. Searches can be performed on any of the fields associated with an error.

Figure 2:
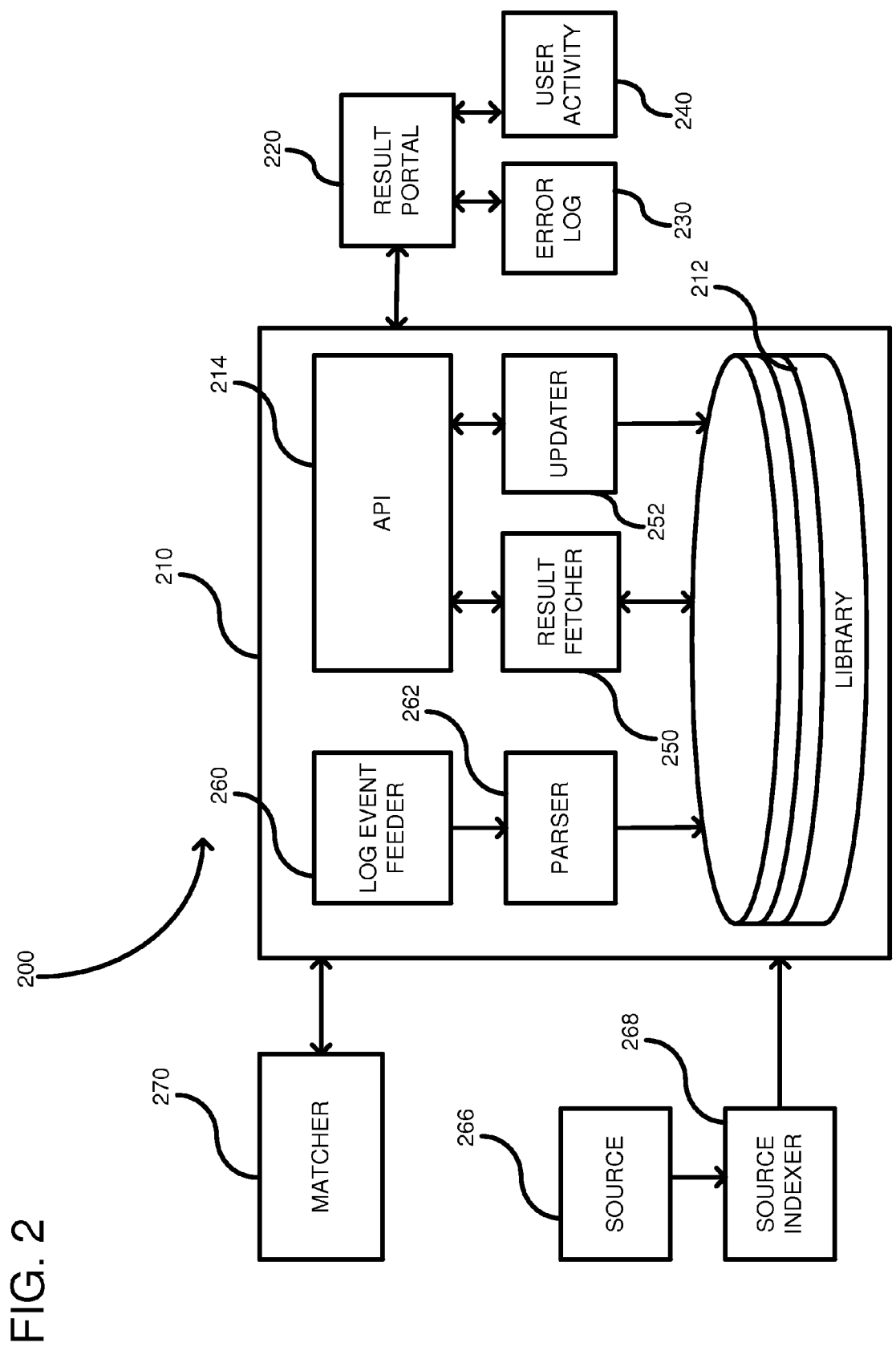
FIG. 2 is a system diagram according to another embodiment for automatically analyzing error logs.

FIG. 2 shows a system 200 according to another embodiment for automatically analyzing test results. An analysis engine 210 can include a library or database 212 that can store a plurality of error log entries in a standardized format with linking information incorporated therein to link together common error log entries. An API 214 allows a user to communicate with the analysis engine 210 to update or search the library 212. The API 214 can be accessed through a result portal 220 that communicates with the API and can report that a new error log 230 has been received. User activity 240 can also be communicated to the analysis engine 210 through the result portal 220. The user activity 240 can be associated with requests to search the library 212 or can be requests to update the library with linking information, as described further below. In the event that the user activity 240 is a request to search the library 212, a user request is sent through the result portal 220 to the API 214. The API then sends the request to a result fetcher module 250, which searches the library 212, obtains results of the search and returns the results to the user through the API. The search can be based on any of the fields associated with an error stored in the library, including event identifiers, error types, error messages, etc. In the event that the user activity 240 is a request to update the library 212, then the API sends a request to an updater 252 that can access the library 212 and change the linking type stored in the library 212 in accordance with the user's instructions.

When a new error log 230 is received, the result portal 220 stores the error log 230 in a log event feeder 260 (including the fields previously described) in a text format. The log event feeder 260 can then pass the error log to a parser 262. The parser 262 can read through the error log to identify the various fields and transform the error log into a standardized format for storage in the library 212. The standardized format can be any of a variety of formats depending on the particular implementation. For example, the fields in the error log can be rearranged, formatted, and/or truncated, etc. in order that the library has a standardized database suitable for searching. Depending on customization information supplied by the user, the parser 262 can also access a source code 266 via a source indexer 268. Using the source indexer 268, a location in the source code associated with the error log can be identified and stored together with the parsed error log in the library 212. Additionally, the parser can generate a unique identifier (the event identifier) to associate with the error log after it is stored in the library 212. Once the parser 262 has completed the transformation, it can notify a matcher 270 that a new error log has been stored. Such a notification can include the event identifier so that the matcher can identify the error log. The matcher 270 can then access the library 212 and perform a search to automatically compare the parsed log data (the new error log) to one or more previous errors stored in the library 212. Specifically, the previous errors have associated error logs stored in a similar format to the new error log and the matcher 270 can compare the error logs in accordance with customization options provided by a user. If a match is found between the parsed log data and a previous error, then the matcher 270 can use the linking type of the matched previous error for associating the two errors together. Thus, the matcher 270 can assess the linking type of the parsed log data and insert the appropriate linking type based on a comparison with previous errors associated with error logs. The error log stored in the library 212 can include a field describing why the error occurred. Such a field can be provided by the user to document information about the error that is useful for evaluation of similar future errors.

Figure 3:
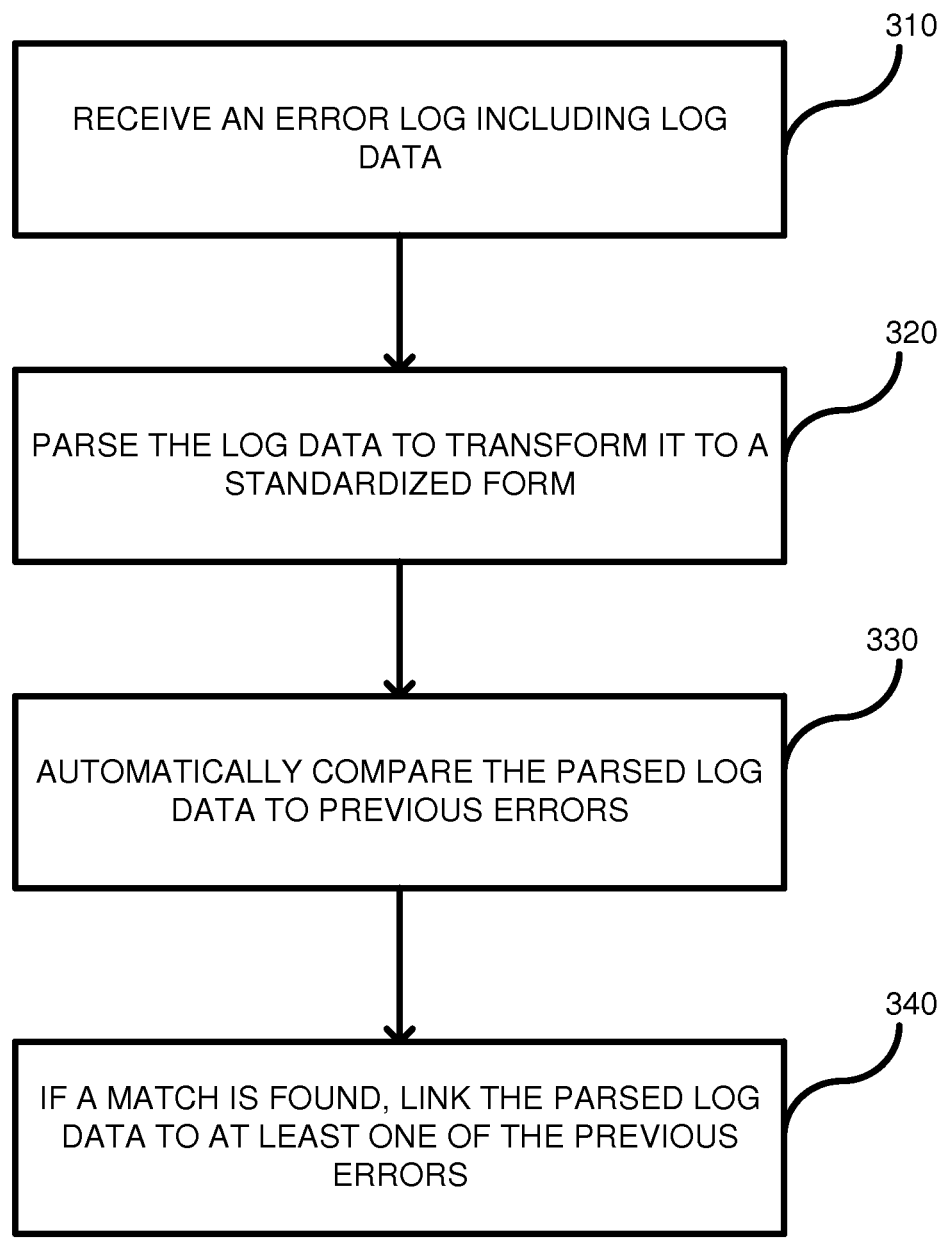
FIG. 3 is a flowchart of a method for automatically analyzing error logs according to another embodiment.

FIG. 3 is a flowchart of a method for analyzing an error log. In process block 310, an error log can be received including log data. The log data can include an error type, an error message, and trace information associated with the error. In process block 320, a parser can parse the log data and transform it to a standardized form. The parser can further create an event identifier to uniquely identify the error log when it is stored in a library. Additionally, the parser can search through source code associated with the application being tested in order to determine a location in the source code wherein the error occurred. In process block 330, a comparison can be automatically made between the parsed log data and previous errors, which have associated log data stored in the library. The comparison can be based on one or more fields. For example, if the error type of parsed log data is the same as the error type of a candidate error, then further comparison can be performed on other fields. If the corresponding fields match according to customization criteria, then a match can be considered found. In process block 340, if a match is found, then the parsed log data is linked to the previous error that was matched so as to associate the two together. In this way, if a user can determine why an error occurred for the parsed log data using an automated technique.

Figure 4:
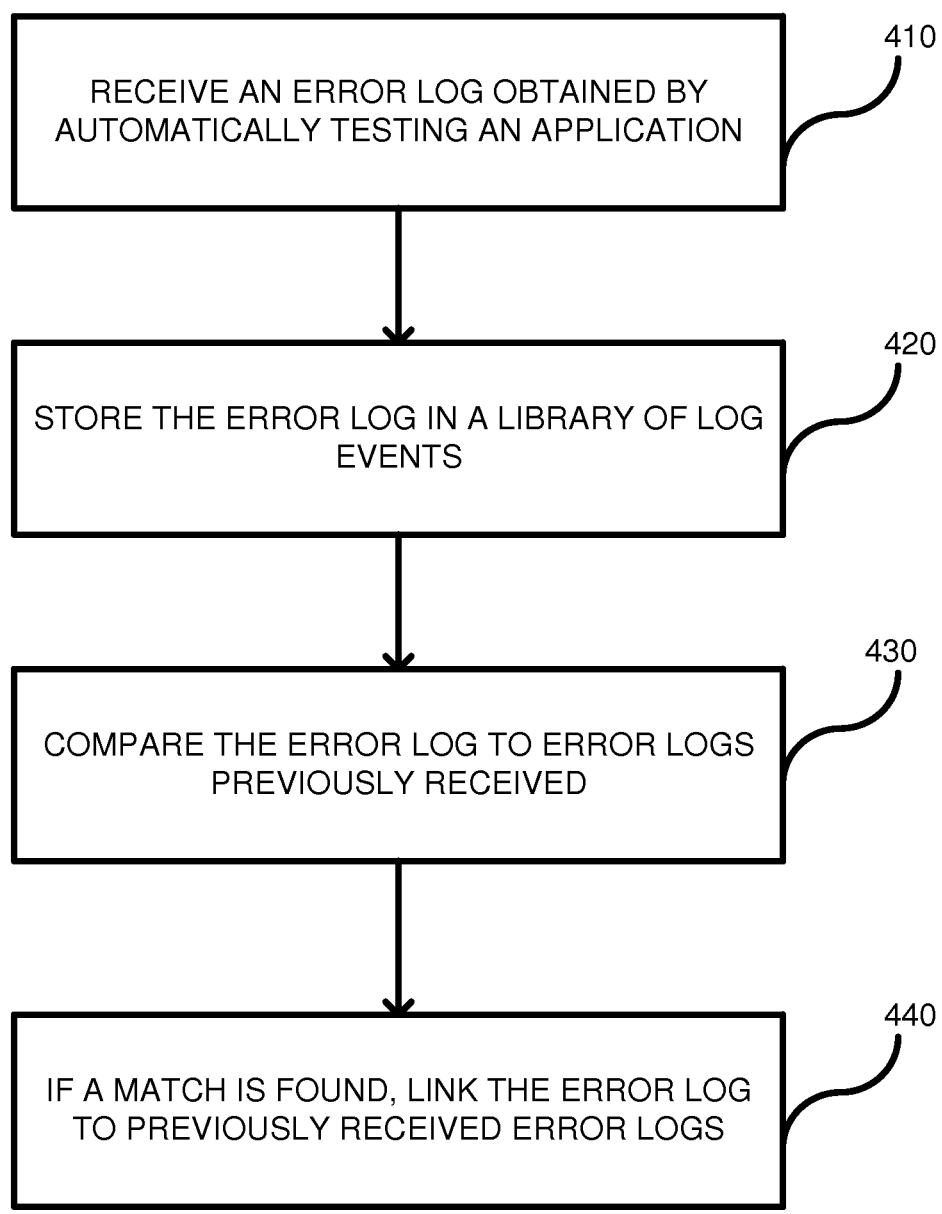
FIG. 4 is a flowchart of a method for automatically analyzing error logs according to another embodiment.

FIG. 4 is a flowchart according to another embodiment. In process block 410, an error log can be received that was obtained by automatically testing an application. For example, an application tester, such as a script, can be used to automatically test buttons, menu items, scroll bars etc. Other UI or non-UI features can be similarly tested. The application tester can generate an error log. In process block 420, the error log can be stored in a library of log events. In process block 430, a comparison can be made between the error log that was stored and previously stored error logs. Thus, a comparison is made to determine if the current error is associated with previous error logs. In process block 440, if a match is found, then the current error is linked to previously received error logs. A user can then search a library for various parameters to quickly determine the cause of an error through comparison with previous errors through a systematic conversion and storage of error information obtained through error logs. If a match is not found, then the error log is stored and identified as a new error that has not been yet seen.

Figure 5:
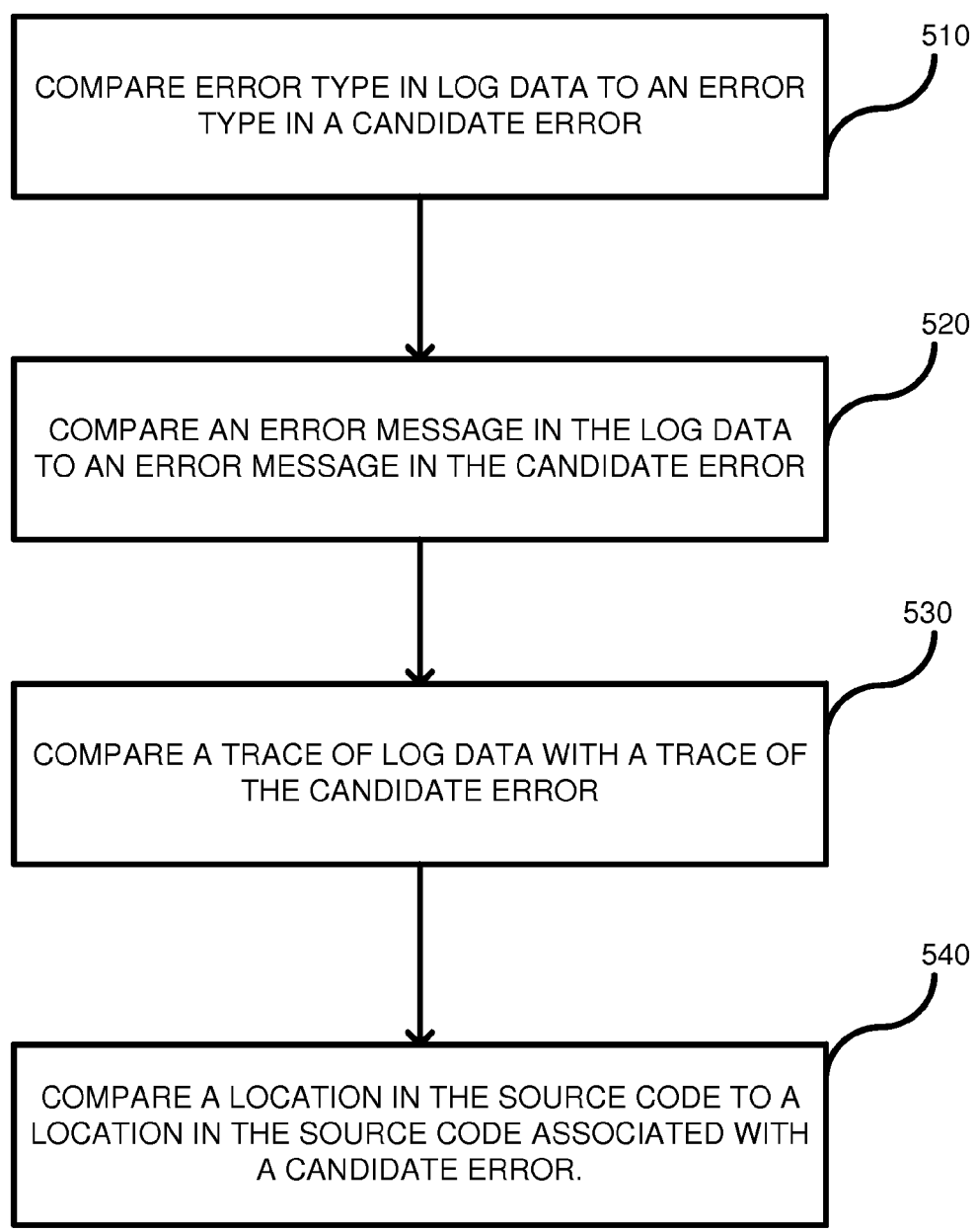
FIG. 5 is a flowchart showing different levels of matching criteria.

FIG. 5 is a flowchart of a method for performing a matching between a current error and a candidate error. In process block 510, an error type in log data is compared to an error type in a candidate error. For the error type, a textual comparison can be performed to determine if both errors are the same. Typically, such a top level matching is insufficient to match the errors. However, based on customization parameters, it can be decided that the top-level matching is sufficient or additional levels need to be matched in order to determine that the errors are the same. If additional levels are required, then in process block 520, a comparison can be made between an error message in the log data to an error message in the candidate error. As previously described, the error message can include a list of possible alternative formats associated with the same error. A match between the error message in the log data with any of the alternatives can be interpreted as a match. If still further levels of analysis are required based on the customization options, then in process block 530, a comparison can be made between a trace of log data with a trace of the candidate error. The trace indicates instructions executed in the application leading up to the occurrence of the error. For the trace, a textual comparison can be made between the trace of the current error and that of previous errors. If the traces are identical or if a certain percentage of the traces are identical (e.g., 80%), then the traces can be considered a match. If yet a further level of analysis is desired, then in process block 540, a location in the source code for the current log data can be compared to a location in the source code of the candidate error. If a match is found through a textual comparison, then the current error and the candidate error can be considered matching. In such an event, the current error can be linked to the candidate error so that future searches that include one of the errors in the results will also include linked errors.

Figure 6:
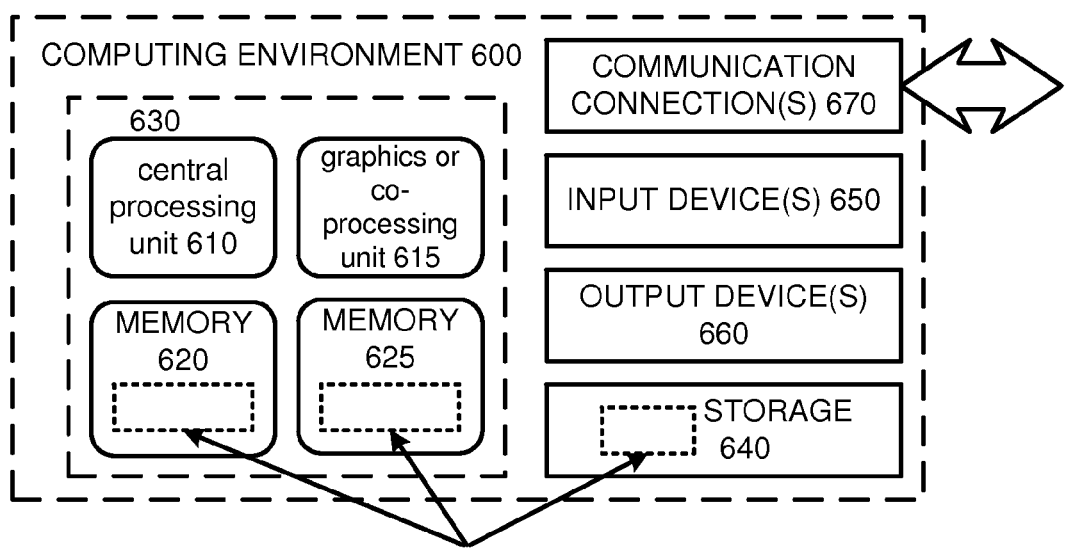
FIG. 6 is an exemplary computing environment that can be used with any of the embodiments described herein.

FIG. 6 depicts a generalized example of a suitable computing environment 600 in which the described innovations may be implemented. The computing environment 600 is not intended to suggest any limitation as to scope of use or functionality, as the innovations may be implemented in diverse general-purpose or special-purpose computing systems. For example, the computing environment 600 can be any of a variety of computing devices (e.g., desktop computer, laptop computer, server computer, tablet computer, media player, gaming system, mobile device, etc.)

With reference to FIG. 6, the computing environment 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s).

A computing system may have additional features. For example, the computing environment 600 includes storage 640, one or more input devices 650, one or more output devices 660, and one or more communication connections 670. An interconnection mechanism (not shown) such as a bus, controller, or network interconnects the components of the computing environment 600. Typically, operating system software (not shown) provides an operating environment for other software executing in the computing environment 600, and coordinates activities of the components of the computing environment 600.

The tangible storage 640 may be removable or non-removable, and includes magnetic disks, magnetic tapes or cassettes, CD-ROMs, DVDs, or any other medium which can be used to store information in a non-transitory way and which can be accessed within the computing environment 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing environment 600. For video encoding, the input device(s) 650 may be a camera, video card, TV tuner card, or similar device that accepts video input in analog or digital form, or a CD-ROM or CD-RW that reads video samples into the computing environment 600. The output device(s) 660 may be a display, printer, speaker, CD-writer, or another device that provides output from the computing environment 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

For example, although the embodiments described herein relate to application testing, the embodiments can equally be applied to error logs of any type generated by automation testing.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A computer-implemented method of analyzing an error log, comprising:
    receiving an error log including log data associated with an error at an analysis engine;
    parsing the log data to transform the log data into a standardized format by the analysis engine;
    automatically comparing the parsed log data to one or more previous errors obtained from error logs using a matcher;
    if a match is found by the matcher between the parsed log data and the one or more previous errors then linking the parsed log data to at least one of the matched, previous errors by the analysis engine, wherein the linking comprises identifying a first linking type of the at least one of the matched, previous errors and storing the first linking type as a linking type of the parsed log data; and
    receiving user input at the analysis engine to change the linking of the parsed log data, wherein changing the linking comprises changing the stored linking type of the parsed log data to a second linking type that is different from the first linking type.

2. The method of claim 1, wherein automatically comparing includes comparing an error type in the log data to an error type in a candidate error amongst the one or more previous errors, and if the error types match, comparing an error message associated with the log data to an error message in the candidate error.

3. The method of claim 2, further including comparing a trace of the log data with a trace of the candidate error, wherein the trace includes a plurality of instructions executed before an error occurred.

4. The method of claim 3, further including comparing a location in a source code associated with the log data where the error occurred with a location of the source code associated with the candidate error.

5. The method of claim 1, wherein the error log is generated by a script that is testing user interface buttons in an application or non-user-interface functionality of the application.

6. The method of claim 1, wherein receiving the error log is through an application programming interface.

7. The method of claim 1, wherein parsing the log data includes receiving the error log in a first format and transforming the error log to a second format, different than the first format.

8. The method of claim 1, wherein automatically comparing the parsed log data to one or more of the previous errors includes searching through a database and generating a base linking type if no match is found.

9. The method of claim 8, wherein linking the parsed log data to at least one of the matched, previous errors, includes matching the parsed log data to a previously generated linking type.

10. One or more computer-readable storage medium for executing a method for analyzing an error log, the method comprising:
receiving an error log obtained as a result of automatically testing an application;
storing the error log in a library of log events;
comparing the error log to error logs previously received;
if a match is found between the error log and a previously received error log, then linking the error log to the previously received error log that was matched, wherein the linking comprises storing a first linking type, of the previously received error log that was matched, as a linking type of the error log; and
receiving user input to change the linking and modifying linking information in the library in response thereto, wherein modifying the linking information comprises changing the stored linking type of the error log to a second linking type that is different from the first linking type.

11. The one or more computer-readable storage medium of claim 10, further including parsing the error log so as to convert it from a first format to a second format so that error logs stored in the library are consistently in the second format.

12. The one or more computer-readable storage medium of claim 10, wherein finding a match includes matching an error log type and an error message between the error log and the previously received error log.

13. The one or more computer-readable storage medium of claim 12, wherein finding a match further includes matching a code trace, leading up to the error, between the error log and the previously received error log.

14. The one or more computer-readable storage medium of claim 10, further including reading source code of the application to determine a first location in the source code associated with the error log and comparing the determined first location with a second location in the source code associated with the previously received error log.

15. A computer system for analyzing an error log, comprising:
a microprocessor;
a memory;
a database library, at least part of which is stored in the memory, including stored previous errors that occurred;
a parser adapted to use the microprocessor to receive an error log including a current error and to transform the error log into a predetermined standard format for storage in the database library;
a matcher adapted to use the microprocessor to search the database library, to compare information in the error log with the previous errors in order to determine if the previous errors are associated with the current error, and if the previous errors are associated with the current error, linking the current error to the previous errors, wherein the linking comprises identifying a first linking type of the previous errors and storing the first linking type as a linking type of the current error; and
an updater coupled to the database library and adapted to use the microprocessor to change linking information between the current error and the previous errors, wherein changing the linking information comprises changing the stored linking type of the current error from the first linking type to a second linking type that is different from the first linking type.

16. The system of claim 15, further including a result fetcher for receiving a user request to search for errors in the database library and for providing displayable results to a user interface.

* * * * *